US012727037B2

(12) United States Patent
Xie et al.

(10) Patent No.: US 12,727,037 B2
(45) Date of Patent: Sep. 1, 2026

(54) PAIRING METHOD, SYSTEM OF WIRELESS PROBE THERMOMETER AND COMPUTER READABLE STORAGE MEDIUM

(71) Applicant: Shenzhen Yingboweiye Technology Co., Ltd, Shenzhen (CN)

(72) Inventors: Jingru Xie, Shenzhen (CN); Zhongyu Tian, Shenzhen (CN)

( * ) Notice: Subject to any disclaimer, the term of this patent is extended or adjusted under 35 U.S.C. 154(b) by 325 days.

(21) Appl. No.: 18/391,731

(22) Filed: Dec. 21, 2023

(65) Prior Publication Data

US 2025/0113388 A1 Apr. 3, 2025

(30) Foreign Application Priority Data

Sep. 28, 2023 (CN) ......................... 202311290047.1

(51) Int. Cl.
*H04W 76/10* (2018.01)
*G01K 1/024* (2021.01)
*H04W 72/30* (2023.01)

(52) U.S. Cl.
CPC ............ *H04W 76/10* (2018.02); *G01K 1/024* (2013.01); *H04W 72/30* (2023.01); *G01K 2215/00* (2013.01)

(58) Field of Classification Search
CPC ....... H04W 76/10; H04W 72/30; H04W 4/06; H04W 4/80; H04W 8/005; H04W 12/50; H04W 76/14; G01K 1/024; G01K 2215/00
See application file for complete search history.

(56) References Cited

U.S. PATENT DOCUMENTS

| | | | | |
|---|---|---|---|---|
| 2017/0006533 | A1 * | 1/2017 | Gould | H04W 76/14 |
| 2019/0250043 | A1 * | 8/2019 | Wu | G01K 3/005 |
| 2022/0053405 | A1 * | 2/2022 | Wang | H04L 45/16 |
| 2022/0333997 | A1 * | 10/2022 | Newhouse | G01K 1/12 |

FOREIGN PATENT DOCUMENTS

| | | | | |
|---|---|---|---|---|
| WO | WO-2024046481 A1 * | 3/2024 | | H04W 76/10 |

* cited by examiner

*Primary Examiner* — Charles C Jiang
*Assistant Examiner* — Margaret Marie Anderson
(74) *Attorney, Agent, or Firm* — Sandy Lipkin

(57) ABSTRACT

Provided are pairing method, system of wireless probe thermometer, and computer readable storage medium. The method includes that the mobile terminal sends pairing mode start command to charging box; the charging box receives the pairing mode start command, and enters the pairing mode according to the command; the wireless temperature probe to be paired sends broadcast signal; the charging box or the mobile terminal acquires the broadcast information of the wireless temperature probe, determines whether the scanned device exists the wireless temperature probe to be paired according to the acquired broadcast signal, and if it exists, determines whether it is in the pairable state according to the acquired broadcast signal; the mobile terminal or the charging box confirms the target wireless temperature probe from the wireless temperature probe to be paired in the pairable state, and controls the charging box to be paired with the target wireless temperature probe.

8 Claims, 3 Drawing Sheets

PAIRING METHOD, SYSTEM OF WIRELESS PROBE THERMOMETER AND COMPUTER READABLE STORAGE MEDIUM

CROSS-REFERENCE TO RELATED APPLICATIONS

The present disclosure claims the priority to the Chinese patent application with the filing No. "2023112900471" filed on Sep. 28, 2023 with the Chinese Patent Office and entitled "Pairing Method, System of Wireless Probe Thermometer and Computer Readable Storage Medium", the contents of which are incorporated herein by reference in entirety.

TECHNICAL FIELD

The present disclosure relates to a field of wireless probe thermometer, and in particular to a pairing method, system of wireless probe thermometer and computer readable storage medium.

BACKGROUND ART

With the rapid development of the wireless probe thermometer, functions of the wireless probe thermometers are more and more complex. The wireless probe thermometer abandons a connection way with cables, and a cableless mode means that users can move freely without worrying about troubles of twining and cleaning of cables. The most wireless thermometers can have a communication range up to 30 feet, while still keeping a reliable and stable data transmission, which provides a convenient and good experience and makes them an ideal choice for customers. The charging box of the wireless probe thermometer not only has the function of storing and charging, but also has the function of a wireless distance expander, so the stability and reliability of the connection of pairing between the wireless probe thermometer and the charging box are of great importance.

The common wireless probe thermometer on the market today completes the pairing at the factory, so the users cannot pair the probe with the charging box on their own. If the user buys a new temperature probe individually only because the probe is broken, and wants to pair the new temperature probe with the charging box, it may not be realized currently. The present wireless probe thermometer exists a problem of lower flexibility when pairing.

SUMMARY

In order to solve the above technical problems, the present disclosure provides a pairing method and system of the wireless probe thermometer and the computer readable storage medium.

In a first aspect, the present disclosure provides a pairing method of the wireless probe thermometer, and the method includes: a mobile terminal establishing a communication connection with a charging box of the wireless probe thermometer to send a pairing mode start command to the charging box; the charging box receiving the pairing mode start command, entering a pairing mode according to the pairing mode start command, and deleting original pairing information; the wireless temperature probe to be paired sending the broadcast signal when the wireless temperature probe to be paired is placed at the charging box, wherein the broadcast signal comprises the request pairing information, and the request pairing information is used to indicate that the wireless temperature probe to be paired is in the pairable state; the charging box or the mobile terminal acquiring broadcast information of the wireless temperature probe, and determining whether a scanned device exists a wireless temperature probe to be paired according to the acquired broadcast signal, if the wireless temperature probe to be paired exists, determining whether the wireless temperature probe to be paired is in the pairable state according to the acquired broadcast signal, and confirming the wireless temperature probe to be paired in the pairable state as a candidate wireless temperature probe; and the mobile terminal or the charging box confirming a target wireless temperature probe from the candidate wireless temperature probes, controlling the charging box to pair with the target wireless temperature probe.

In an embodiment, determining whether the scanned device exists the wireless temperature probe to be paired according to the acquired broadcast signal includes: determining a key data feature of the acquired broadcast signal, wherein the key data feature comprises at least one of: data format, length, type and Bluetooth device identification; and comparing the key data feature with the preset data feature, and confirming that the scanned device exists the wireless temperature probe to be paired when the key data feature is the same as the preset data feature, wherein the preset data feature is the data feature extracted according to the wireless temperature probe.

In an embodiment, determining whether the wireless temperature probe to be paired is in the pairable state according to the acquired broadcast signal includes: determining whether the signal strength of the acquired broadcast signal is in a preset strength range; and determining that the candidate wireless temperature probe is in the pairable state if the signal strength of the acquired broadcast signal falls within the preset strength range.

In an embodiment, determining whether the wireless temperature probe to be paired is in the pairable state according to the acquired broadcast signal further includes: determining that the wireless temperature probe to be paired is in a forbidden state if the signal strength of the acquired broadcast signal does not fall within the preset strength range.

In an embodiment, the mobile terminal establishes the communication connection with the charging box of the wireless probe thermometer, and the mobile terminal sending the pairing mode start command to the charging box includes: the mobile terminal establishing a Bluetooth or WiFi communication connection with the charging box, and the mobile terminal sending the pairing mode start command to the charging box through the Bluetooth or WiFi communication connection.

In an embodiment, the mobile terminal establishes the communication connection with the charging box of the wireless probe thermometer, and the mobile terminal sending the pairing mode start command to the charging box includes: the mobile terminal establishing the WiFi communication connection with the charging box through the router, and the mobile terminal sending the pairing mode start command to the charging box by using the WiFi communication connection; or, the mobile terminal establishing a hybrid communication connection with the charging box through a mobile base station, a cloud server and a router, and the mobile terminal sending the pairing mode start command to the charging box by using the hybrid communication connection.

In an embodiment, the mobile terminal or the charging box confirming the target wireless temperature probe from the candidate wireless temperature probe includes: the mobile terminal or the charging box displaying the candidate wireless temperature probe, and determining the target wireless temperature probe from the candidate wireless operation according to a selection operation of user; or, the mobile terminal or the charging box confirming the wireless temperature probe of the largest signal strength as the target wireless temperature probe from the candidate wireless temperature probes.

In a second aspect, the present disclosure provides a pairing system of the wireless probe thermometer, including: the mobile terminal, used to establish the communication connection with the charging box of the wireless probe thermometer to send the pairing mode start command to the charging box; the charging box, used to receive the pairing mode start command, enter the pairing mode according to the pairing mode start command, and delete the original pairing information; the wireless temperature probe to be paired, used to send the broadcast signal when the wireless temperature probe to be paired is placed at the charging box, wherein the broadcast signal comprises the request pairing information, and the request pairing information is used to indicate that the wireless temperature probe to be paired is in the pairable state; the charging box or the mobile terminal, further used to acquire the broadcast information of the wireless temperature probe, determine whether the scanned device exists the wireless temperature probe to be paired according to the acquired broadcast signal, if the wireless temperature probe to be paired exists, determine whether the wireless temperature probe to be paired is in the pairable state according to the acquired broadcast signal, and confirm the wireless temperature probe to be paired in the pairable state as a candidate wireless temperature probe; and the mobile terminal or the charging box, further used to confirm the target wireless temperature probe from the candidate wireless temperature probes, and control the charging box to pair with the target wireless temperature probe.

In an embodiment, the charging box or the mobile terminal is further used to determine the key data feature of the acquired broadcast signal, the key data feature includes at least one of: data format, length, type and Bluetooth device identification; and compare the key data feature with the preset data feature, and confirm that the scanned device exists the wireless temperature probe to be paired when the key data feature is the same as the preset data feature, wherein the preset data feature is the data feature extracted according to the wireless temperature probe.

In a third aspect, the present disclosure provides a computer readable storage medium storing computer programs thereon, and the computer program executes the pairing method of the wireless probe thermometer provided in the first aspect when running on a processor.

The present disclosure foregoing provides the pairing method, system of the wireless probe thermometer and computer readable storage medium. The method comprises a mobile terminal establishing a communication connection with a charging box of the wireless probe thermometer to send a pairing mode start command to the charging box; the charging box receiving the pairing mode start command, entering a pairing mode according to the pairing mode start command, and deleting original pairing information; the wireless temperature probe to be paired sending the broadcast signal when the wireless temperature probe to be paired is placed at the charging box, wherein the broadcast signal comprises the request pairing information, and the request pairing information is used to indicate that the wireless temperature probe to be paired is in the pairable state; the charging box or the mobile terminal acquiring a broadcast information of the wireless temperature probe, and determining whether a scanned device exists a wireless temperature probe to be paired according to the acquired broadcast signal, if the wireless temperature probe to be paired exists, determining whether the wireless temperature probe to be paired is in the pairable state according to the acquired broadcast signal, and confirming the wireless temperature probe to be paired in the pairable state as a candidate wireless temperature probe; and the mobile terminal or the charging box confirming a target wireless temperature probe from the candidate wireless temperature probes, and controlling the charging box to pair with the target wireless temperature probe. In this way, through the operation of the mobile terminal, the pairing of the wireless temperature probe and the charging box may complete, which solves the problem that the users cannot pair the wireless temperature probe with the charging box by their own. It is only necessary to re-pair the new wireless temperature probe with the charging box when the wireless temperature probe is broken without purchasing the whole set of products, which greatly improves the pairing flexibility, and convenience and usability of the products.

BRIEF DESCRIPTION OF DRAWINGS

In order to more clearly illustrate the technical solution of the present disclosure, the drawings need to be used in embodiments will be briefly described as follows, and it should be understood that the following drawings only show certain embodiments of the present disclosure, and therefore should not be regarded as limiting the scope of protection of the present disclosure. Similar numbers are used for similar components in various drawings.

REFERENCE NUMBERS

Figure 1:
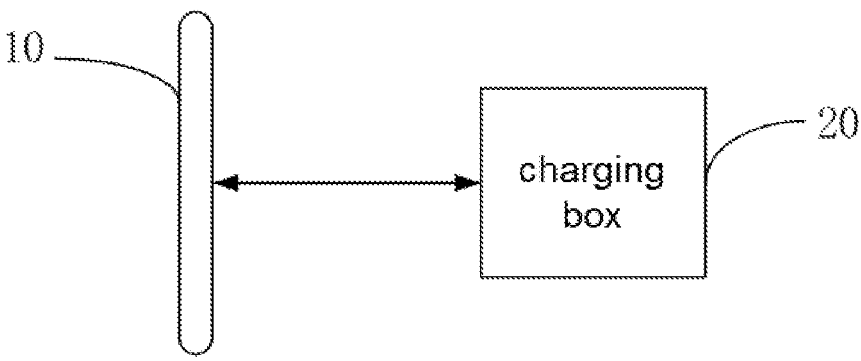
FIG. 1 illustrates a structure schematic diagram of the pairing system of the wireless probe thermometer provided by the present disclosure.

10—wireless temperature probe, 20—charging box, 30—router, 40—mobile terminal, 50—cloud server, 60—base station.

DETAILED DESCRIPTION OF EMBODIMENTS

The technical solution of the present disclosure will be clearly and completely described below in conjunction with the drawings in the present disclosure, and it is clear that the embodiments described are only a portion of the embodiments of the present disclosure and not all of the embodiments.

The components of the present disclosure generally described and shown in the drawings herein may be arranged and designed in various different configurations.

Therefore, the following detailed description of embodiments of the present disclosure provided by the drawings is not intended to limit the scope of protection of the present disclosure, but only illustrate the selected embodiments of the present disclosure. According to the embodiments of the present disclosure, all other embodiments obtained by persons skilled in the art without making creative labors fall within the scope of protection of the present disclosure.

In the following, the terms "include", "have" and their cognates, which may be used in various embodiments of the present disclosure, are intended only to denote a particular feature, number, step, operation, element, component, or combination of the foregoing, and should not be understood as the existence of excluding one or more other features, numbers, steps, operations, elements, components, or combinations of the foregoing firstly, or the possibilities of increasing one or more features, numbers, steps, operations, elements, components, or combinations of the foregoing.

Furthermore, the terms "first", "second", "third", etc., are only used for differentiation and may not to be understood as indicating or implying relative importance.

Unless otherwise defined, all terms (including technical terms and scientific terms) used herein have the same meaning as commonly understood by those ordinary skilled in the art belonging to the various embodiments of the present disclosure. The terms (such as those defined in dictionaries of general use) will be explained to have the same meaning as the contextual meaning in the relevant field of technology, and will not be explained to have an idealized meaning or an overly formalized meaning, unless clearly defined in various embodiments of the present disclosure.

In the present wireless probe thermometer, when the user wants to replace the new wireless temperature probe 10, the user must purchase the whole set of products, that is, purchase the wireless temperature probe 10 and the charging box 20, so the original charging box 20 may be discarded. This method has the poor flexibility of pairing, which not only increases the use cost of the customer, but also is not environmental.

Example 1

Figure 2:
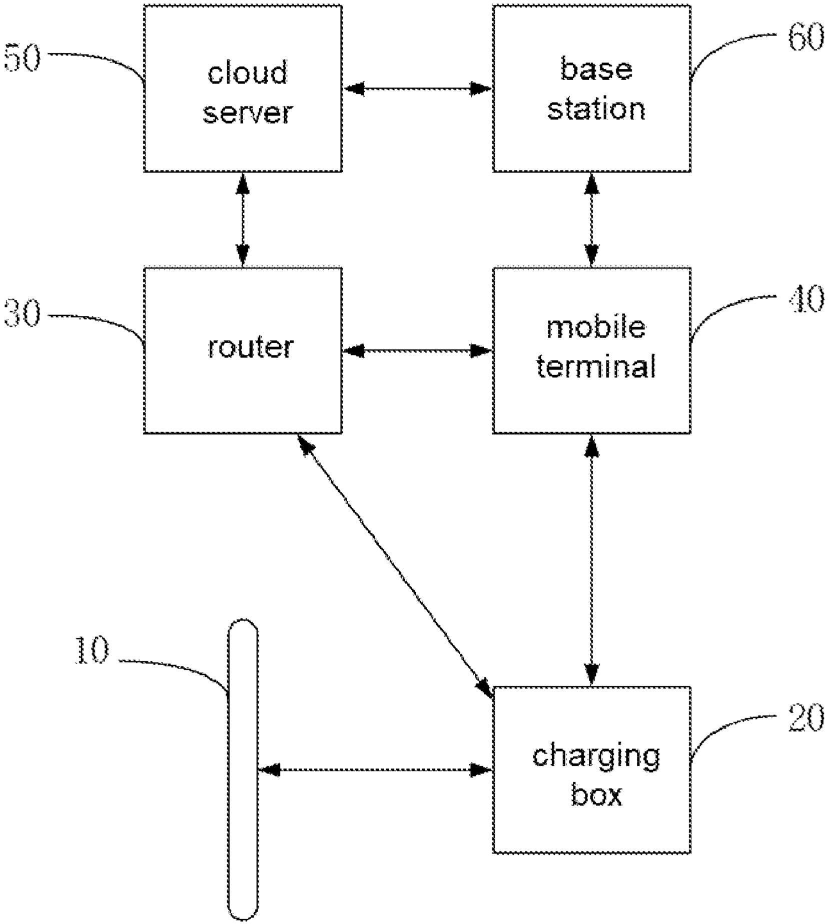
FIG. 2 illustrates another structure schematic diagram of the pairing system of the wireless probe thermometer provided by the present disclosure.

The present disclosure provides a pairing method of the wireless probe thermometer, and the method can be used for the pairing system of the wireless probe thermometer. Referring to FIG. 1, the pairing system of the wireless probe thermometer includes the wireless temperature probe 10 and the charging box 20. Furthermore, referring to FIG. 2, the pairing system of the wireless probe thermometer may further include the router 30, the mobile terminal 40, the cloud server 50, and the base station 60, besides the wireless temperature probe 10 and the charging box 20, The pairing method of the wireless probe thermometer provided by the present embodiment can enable wireless temperature probe 10 of the user to be paired with any charging box 20, thereby improving the pairing flexibility.

Figure 3:
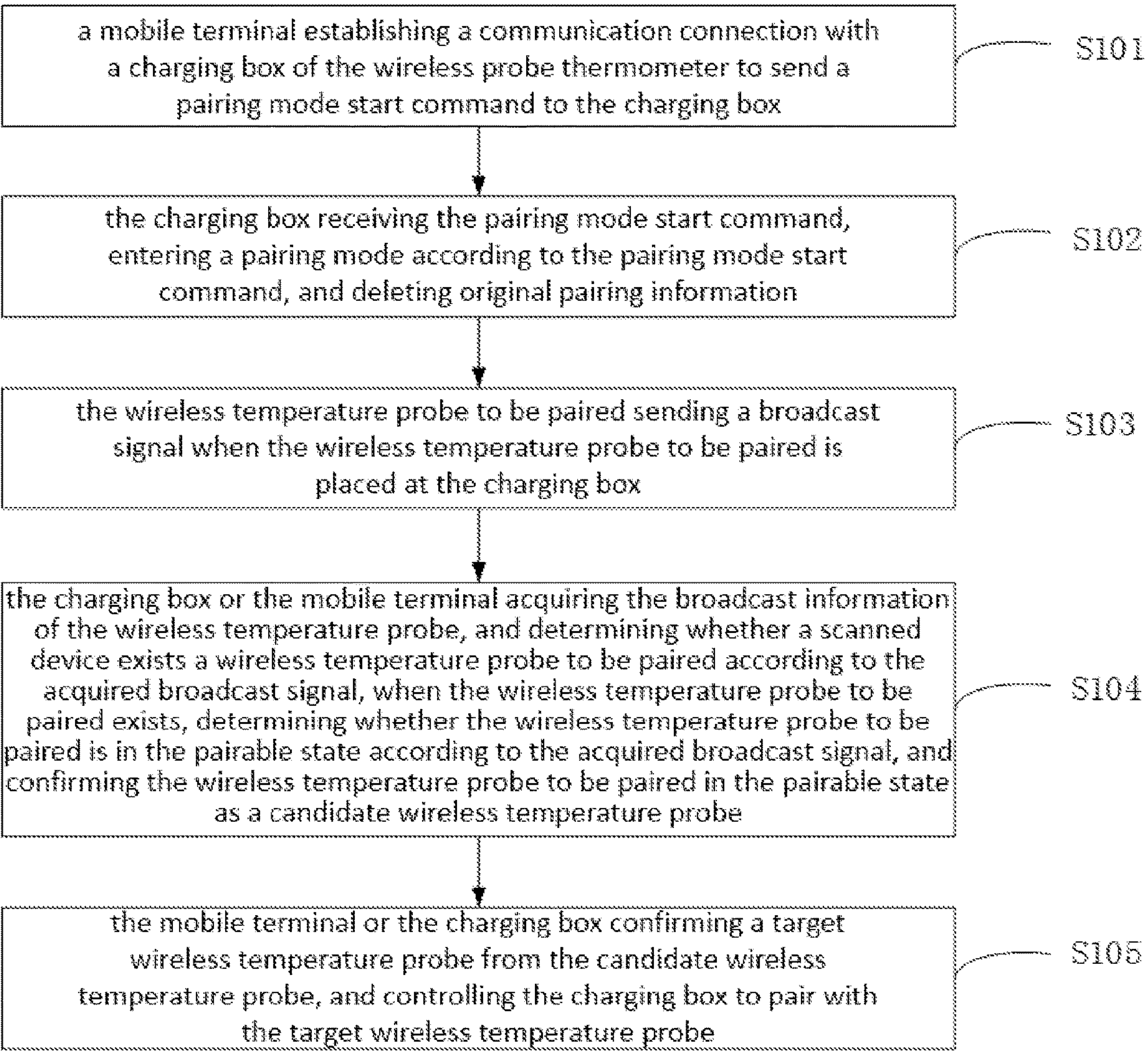
FIG. 3 illustrates a flow schematic diagram of the pairing method of the wireless probe thermometer provided by the present disclosure.

Referring to FIG. 3, the pairing method of the wireless probe thermometer includes steps S101-105, and each step of the method is described below.

Step S101, the mobile terminal 40 establishes the communication connection with the charging box 20 of the wireless probe thermometer, so as to send the pairing mode start command to the charging box 20.

In the embodiment, the mobile terminal 40 may be a cell phone, and the application software of the mobile terminal 40 may control the charging box 20 to pair with the probe through the Bluetooth, and the wireless fidelity transmission technology (WiFi). The communication method between the charging box 20 and the wireless temperature probe 10 includes Bluetooth, Sub-G, and may be other near field communication methods, which are not limited herein. The communication method between the charging box 20 and the cloud server 50 includes WiFi, mobile communication, Bluetooth, and other methods, which are not limited herein. The communication method between the application software of the mobile terminal 40 and the charging box 20 includes WiFi, mobile communication, Bluetooth, and other means, which are not limited herein. The charging box 20 has the function of managing, saving, and deleting the pairing information, so as to realize the pairing with any of the wireless temperature probes 10.

Exemplarily, the mobile terminal 40 displays a setup page of the wireless thermometer, and controls the wireless temperature probe 10 to enter the pairing mode according to the setup page, and may also control the charging box 20 of the wireless probe thermometer to enter the pairing mode according to the setup page.

In an embodiment, step S101 includes:

the mobile terminal 40 establishing a Bluetooth or WiFi communication connection with the charging box 20, and the mobile terminal 40 sending the pairing mode start command to the charging box 20 through the Bluetooth or WiFi communication connection.

In another embodiment, step S101 includes:

the mobile terminal 40 establishing the WiFi communication connection with the charging box 20 through router 30, and the mobile terminal 40 sending the pairing mode start command to the charging box 20 by using the WiFi communication connection; or, the mobile terminal 40 establishing the hybrid communication connection with the charging box 20 through the mobile base station 60, the cloud server, the router 30, and the mobile terminal 40 sending the pairing mode start command to the charging box 20 by using the hybrid communication connection.

Exemplarily, in FIG. 1, the wireless temperature probe 10 is connected to the charging box 20 through the near field communication method. Exemplarily, in FIG. 2, the WiFi connection is made between the charging box 20 and the router 30, the Bluetooth connection is made between the charging box 20 and the mobile terminal 40, the WiFi connection is made between the mobile terminal 40 and the router 30, the mobile communication connection is made between the mobile terminal 40 and the base station 60, the communication connection is made between the base station 60 and the cloud server 50, and the network connection is made between the cloud server 50 and the router 30. The pairing control between the wireless temperature probe 10 and the charging box 20 is carried out through a plurality of communication methods, such as a direct communication method, the WiFi communication connection and the hybrid communication connection of the near field communication, etc., which can provide an alternative control channel. When one of the communication methods fails to connect, the other alternative methods may ensure that the wireless temperature probe 10 and the charging box 20 can complete the pairing, thereby improving the success rate of pairing.

Step S102, the charging box 20 receives the pairing mode start command, enters pairing mode according to the pairing mode start command, and deletes the original pairing information.

It should be noted that, the original pairing information includes the pairing relationship established by the charging box 20 before. Therefore, deleting the original pairing information may reduce memory requirements and avoids errors when using the probe subsequently.

Step S103, the wireless temperature probe to be paired 10 sends the broadcast signal when the wireless temperature probe to be paired 10 is placed at the charging box 20.

It should be noted that the number of wireless temperature probe to be paired 10 is not limited, and may be one or more, as confirmed according to the actual design of the charging box 20.

In an embodiment, the broadcast signal includes the request pairing information, and the request pairing information is used to indicate that the wireless temperature probe to be paired 10 is in the pairable state. The broadcast signal is a wireless broadcast signal. The request pairing information indicates that the wireless temperature probe to be paired 10 is in an initiating pairing and pairable state.

In an embodiment, the wireless temperature probe 10 may be into pairing mode through the operation of button of the charging box 20, or the application software (app) of the mobile terminal 40, thereby sending the broadcast signal, which indicates that the wireless temperature probe 10 is in the initiating pairing and to-be-paired state.

Step S104, the charging box or the mobile terminal acquires the broadcast information of the wireless temperature probe, determines whether the scanned device exists the wireless temperature probe to be paired according to the acquired broadcast signal, if the wireless temperature probe to be paired exists, determines whether the wireless temperature probe to be paired is in the pairable state according to the acquired broadcast signal, and confirms the wireless temperature probe to be paired in the pairable state as a candidate wireless temperature probe.

It should be noted that the charging box 20 searches the surrounding environment under the pairing mode for the existence of the wireless temperature probe to be paired 10. The mobile terminal 40 also has a search function to search the surrounding environment for the existence of the wireless temperature probe to be paired 10. Since the surrounding environment exists a plurality of different types of Bluetooth devices, and the scanned device may not necessarily be the wireless temperature probe 10, it is necessary to determine first whether or not the wireless temperature probe 10 exists in the scanned device.

Figures 4, 5:
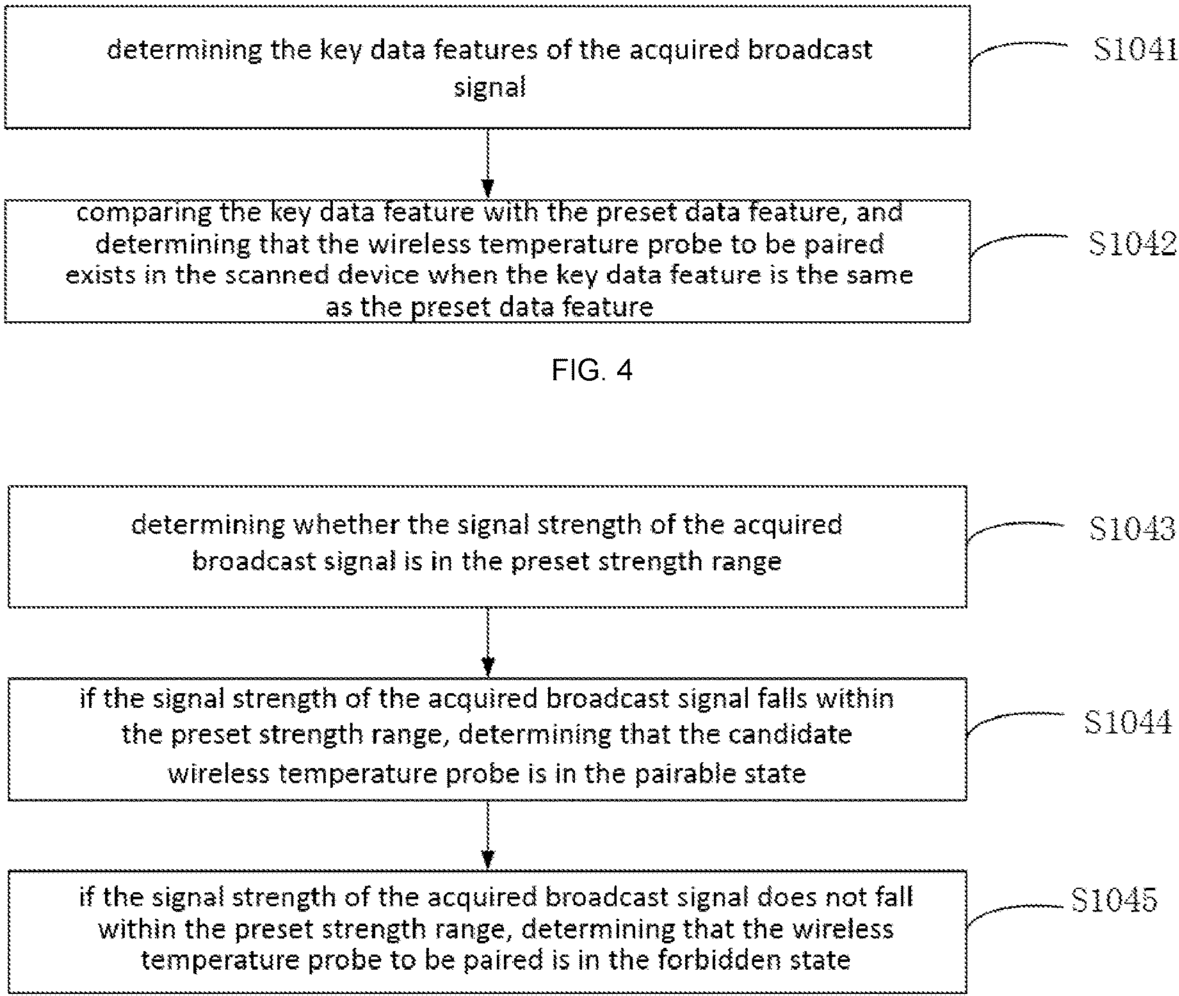
FIG. 4 illustrates another flow schematic diagram of the pairing method of the wireless probe thermometer provided by the present disclosure.
FIG. 5 illustrates another flow schematic diagram of the pairing method of the wireless probe thermometer provided by the present disclosure.

Referring to FIG. 4, the step S104 of determining whether the wireless temperature probe to be paired 10 exists in the scanned device according to the acquired broadcast signal includes steps S1041-steps S1042, which will be described below.

Step S1041, determining the key data features of the acquired broadcast signal.

In an embodiment, the key data feature includes at least one of: data format, length, type and Bluetooth device identification.

It is to be noted that the broadcast signal sent by the wireless temperature probe 10 has certain features, so it may determine whether the acquired broadcast signal is the broadcast signal of the wireless temperature probe 10 from the dimensions of data format, data length, data type, Bluetooth device identification, etc. The Bluetooth device identification includes Bluetooth device name, Bluetooth device serial number, etc., and is not limited herein.

Step S1042, comparing the key data feature with the preset data feature, and determining that the wireless temperature probe to be paired 10 exists in the scanned device when the key data feature is the same as the preset data feature.

In an embodiment, the preset data features are data features extracted according to the wireless temperature probe 10. The preset data features are the Bluetooth device identification, the data format, the data type and the data length of the wireless temperature probe 10, etc.

Exemplarily, the key data feature is the Bluetooth device identification, and the Bluetooth device identification of the acquired broadcast signal is compared with the Bluetooth device identification of the preset wireless temperature probe 10, and if they are the same, the wireless temperature probe to be paired 10 is confirmed to exist in the scanned device.

It should be noted that after confirming that the wireless temperature probe 10 exists in the scanned device, it is also necessary to determine whether the wireless temperature probe 10 is in the pairable state, so as to continue the subsequent pairing process.

Referring to FIG. 5, the step S104 of determining whether the wireless temperature probe to be paired 10 is in the pairable state according to the acquired broadcast signal includes steps S1043-steps S1045, as described below.

Since the broadcast signal is the signal sent by the wireless temperature probe 10, so the state of the wireless temperature probe 10 can be confirmed from the strength of the broadcast signal.

Step S1043, determining whether the signal strength of the acquired broadcast signal is in the preset strength range.

Step S1044, if the signal strength of the acquired broadcast signal falls within the preset strength range, determining that the candidate wireless temperature probe 10 is in the pairable state.

Step S1045, if the signal strength of the acquired broadcast signal does not fall within the preset strength range, determining that the wireless temperature probe to be paired 10 is in the forbidden state.

In the embodiment, it may determine whether the acquired broadcast signal includes the broadcast signal through the mobile terminal 40 or the charging box 20, and the acquired broadcast signal may also transmit between the mobile terminal 40 and the charging box 20, which is not limited herein. The preset strength range may be set according to the actual situation or test experience, for example, a range of 50-70 may be set as the present strength range, which is not limited herein.

Step S105, the mobile terminal 40 or the charging box 20 confirms the target wireless temperature probe 10 from the candidate wireless temperature probes, and then controls the charging box 20 to pair with the target wireless temperature probe 10.

In the embodiment, if the charging box 20 is successfully paired with the target wireless temperature probe 10, the charging box 20 returns the successful pairing message to the mobile terminal 40, and the charging box 20 saves the pairing information, such that the pairing completes.

In an embodiment, the step S105 includes:

the mobile terminal 40 or the charging box 20 displaying the candidate wireless temperature probes, and confirming the target wireless temperature probe 10 from the candidate wireless operations according to a selection operation of user; or, the mobile terminal 40 or the charging box 20 confirming the wireless temperature probe 10 of the highest signal strength from the candidate wireless temperature probes 10 as the target wireless temperature probe 10.

In this way, the target wireless temperature probe 10 can be flexibly confirmed by a selection operation of user, which increases the flexibility of user's operation. By confirming the wireless temperature probe 10 of the highest signal strength from the candidate wireless temperature probes 10 as the target wireless temperature probe 10, it can realize the automated control and improves the automation degree.

The pairing method of the wireless probe thermometer provided by the embodiment, the mobile terminal 40 establishes the communication connection with the charging box 20 of the wireless probe thermometer, so as to send the pairing mode start command to the charging box 20. The charging box 20 receives the pairing mode start command, enters the pairing mode according to the pairing mode start command, and deletes the original pairing information. The wireless temperature probe to be paired 10 sends the broadcast signal when the wireless temperature probe to be paired 10 is placed at the charging box 20. The broadcast signal includes the request pairing information, wherein the request pairing information is used to indicate that the wireless temperature probe to be paired 10 is in the pairable state. The charging box 20 or the mobile terminal 40 acquires the broadcast information of the wireless temperature probe, determines whether the scanned device exists the wireless temperature probe to be paired 10 according to the acquired broadcast signal, if the wireless temperature probe to be paired 10 exists, determines whether the wireless temperature probe to be paired 10 is in the pairable state according to the acquired broadcast signal, and confirms the wireless temperature probe 10 to be paired in the pairable state as the candidate wireless temperature probe 10. The mobile terminal 40 or the charging box 20 confirms the target wireless temperature probe 10 from the candidate wireless temperature probes, and then controls the charging box 20 to pair with the target wireless temperature probe 10. In this way, through the operation of the mobile terminal 40, the pairing of the wireless temperature probe 10 and the charging box 20 may complete, which solves the problem that the users cannot pair the wireless temperature probe 10 with the charging box 20 by their own. It is only necessary to re-pair the new wireless temperature probe 10 with the charging box 20 when the wireless temperature probe 10 is broken without purchasing the whole set of products, which greatly improves the pairing flexibility, convenience and usability of the products.

Example 2

In addition, the present disclosure provides the pairing system of the wireless probe thermometer.

The pairing system of the wireless probe thermometer includes:

- the mobile terminal 40, used to establish the communication connection with the charging box 20 of the wireless probe thermometer, so as to send the pairing mode start command to the charging box 20;
- the charging box 20, used to receive the pairing mode initiation command, enter the pairing mode according to the pairing mode start command, and delete the original pairing information;
- the wireless temperature probe to be paired 10, used to send the broadcast signal when the wireless temperature probe to be paired 10 is placed at the charging box 20, wherein the broadcast signal includes the request pairing information, and the request pairing information is used to indicate that the wireless temperature probe to be paired 10 is in the pairable state;
- the charging box 20 or the mobile terminal 40, further used to acquire the broadcast information of the wireless temperature probe, determine whether the wireless temperature probe to be paired 10 exists in the scanned device according to the obtained broadcast signal, if the candidate wireless temperature probe 10 exists, determine whether the wireless temperature probe to be paired 10 is in the pairable state according to the acquired broadcast signal, and confirm the wireless temperature probe 10 to be paired in the pairable state as the candidate wireless temperature probe 10; and
- the mobile terminal 40 or the charging box 20, further used to determine the target wireless temperature probe 10 from the candidate wireless temperature probes, and control the charging box 20 to pair with the target wireless temperature probe 10.

In an embodiment, the charging box 20 or the mobile terminal 40 is further used to confirm the key data feature of the acquired broadcast signal, wherein the key data feature includes at least one of: data format, length, type and Bluetooth device identification; and

- compare the key data feature with the preset data feature, and determine the scanned device exists the wireless temperature probe to be paired 10 when the key data feature is the same as the preset data feature, wherein the preset data feature is the data feature extracted according to the wireless temperature probe 10.

In an embodiment, the charging box 20 or the mobile terminal 40 is further used to determine whether the signal strength of the broadcast signal is in the preset strength range.

If the signal strength of the acquired broadcast signal falls within the preset strength range, it may determine that the candidate wireless temperature probe 10 is in the pairable state.

In an embodiment, the charging box 20 or the mobile terminal 40 is further used for that, if the signal strength of the acquired broadcast signal does not fall within the preset strength range, it may determine that the wireless temperature probe to be paired 10 is in the forbidden state.

In an embodiment, the mobile terminal 40 establishes the Bluetooth or WiFi communication connection with the charging box 20, and the mobile terminal 40 is further used to send the pairing mode start command to the charging box 20 through the Bluetooth or WiFi communication connection.

In an embodiment, the mobile terminal 40 establishes the WiFi communication connection with the charging box 20 through router 30, and the mobile terminal 40 is further used to send the pairing mode start command to the charging box 20 by using the WiFi communication connection; or,

- the mobile terminal 40 establishes the hybrid communication connection with the charging box 20 through the mobile base station 60, the cloud server, and the router 30, and the mobile terminal 40 is further used to send the pairing mode start command to the charging box 20 by using the hybrid communication connection.

In an embodiment, the mobile terminal 40 or the charging box 20 is further used to display the candidate wireless temperature probe, and confirm the target wireless temperature probe 10 from the candidate wireless operations according to the a selection operation of user; or,

- the mobile terminal 40 or the charging box 20 is further used to confirm the wireless temperature probe 10 of the highest signal strength from the candidate wireless temperature probes 10 as the target wireless temperature probe 10.

The pairing system of the wireless probe thermometer provided by the embodiment may realize the pairing method of the wireless probe thermometer provided in Example 1, which will not be repeated herein to avoid repetition.

The pairing system of the wireless probe thermometer provided by the embodiment, the mobile terminal 40 establishes the communication connection with the charging box 20 of the wireless probe thermometer, so as to send the pairing mode start command to the charging box 20. The charging box 20 receives the pairing mode start command, enters the pairing mode according to the pairing mode start command, and deletes the original pairing information. The wireless temperature probe to be paired 10 sends the broadcast signal when the wireless temperature probe to be paired 10 is placed at the charging box 20. The broadcast signal includes the request pairing information, wherein the request pairing information is used to indicate that the wireless temperature probe to be paired 10 is in the pairable state. The charging box 20 or the mobile terminal 40 acquires the broadcast signal, and determines whether the wireless temperature probe to be paired 10 exists in the scanned device according to the obtained broadcast signal. If the wireless temperature probe to be paired 10 exists, it determines whether the wireless temperature probe to be paired 10 is in the pairable state according to the acquired broadcast signal, and confirms the wireless temperature probe 10 to be paired in the pairable state as the candidate wireless temperature probe 10. The mobile terminal 40 or the charging box 20 confirms the target wireless temperature probe 10 from the candidate wireless temperature probes, and then controls the charging box 20 to pair with the target wireless temperature probe 10. In this way, through the operation of the mobile terminal 40, the pairing of the wireless temperature probe 10 and the charging box 20 may complete, which solves the problem that the users cannot pair the wireless temperature probe 10 with the charging box 20 by their own. It is only necessary to re-pair the new wireless temperature probe 10 with the charging box 20 when the wireless temperature probe 10 is broken without purchasing the whole set of products, which greatly improves the pairing flexibility, convenience and usability of the products.

Example 3

The present disclosure further provides a computer readable storage medium, wherein the computer readable storage medium stores the computer program, and the computer program realizes the pairing method of the wireless probe thermometer provided by the Example 1 when executed by the processor.

In the embodiment, the computer readable storage medium may be a Read-Only Memory (ROM), a Random Access Memory (RAM), a disk, or a CD-ROM, etc.

The computer readable storage medium provided by the embodiment can realize the pairing method of the wireless probe thermometer provided in Example 1, which will not be repeated herein to avoid repetition.

It should be noted that, as used in the context, the terms "include", "comprise", or any other variation thereof, are intended to cover non-exclusive conclusion, so that the process, method, object or terminal including a set of elements includes not only those elements, but also other elements that are not explicitly listed, or includes the elements that are inherent in the process, method, object or terminal. Without further limitation, that the element defined by the statement "include a . . . " does not exclude the case of the other same element existing in the process, method, object or terminal that includes the element.

By the above description of the embodiments, those skilled in the art may clearly realize that the above embodiment method can be realized with the help of software plus the necessary general hardware platform, or of course with the help of hardware, but in many cases the former is the better implementation. According to this understanding, the technical solution of the present disclosure, essentially or the part making contributions to the prior art, may be embodied in form of the software product. The computer software product stores in a storage medium (e.g., ROM/RAM, disk, CD-ROM) including a plurality of the instructions to enable the terminal (which may be a cell phone, computer, server, air conditioner, or networked device, etc.) to execute the method described in various embodiments of the present disclosure.

The embodiments of the present disclosure are described above in conjunction with the drawings, but the present disclosure is not limited to the above specific embodiments, and the above specific embodiments are merely schematic, but is not restrictive. Under the enlightenment of the present disclosure, persons of ordinary skilled in the art may also make a plurality of forms without departing from the purpose and the protective scope of the claims of the present disclosure, which all belong to the protection of the present disclosure.

What is claimed is:

1. A pairing method of wireless probe thermometer, wherein the method comprises:

a mobile terminal establishing a communication connection with a charging box of the wireless probe thermometer to send a pairing mode start command to the charging box;

the charging box receiving the pairing mode start command, entering a pairing mode according to the pairing mode start command, and deleting original pairing information;

the wireless temperature probe to be paired sending a broadcast signal when the wireless temperature probe to be paired is placed at the charging box, wherein the broadcast signal includes a request pairing information, wherein the request pairing information is used to indicate that the wireless temperature probe to be paired is in a pairable state;

the charging box or the mobile terminal acquiring the broadcast information of the wireless temperature probe, and determining whether a scanned device exists a wireless temperature probe to be paired according to the acquired broadcast signal, when the wireless temperature probe to be paired exists, determining whether the wireless temperature probe to be paired is in the pairable state according to the acquired broadcast signal, and confirming the wireless temperature probe to be paired in the pairable state as a candidate wireless temperature probe; and the mobile terminal or the charging box confirming a target wireless temperature probe from the candidate wireless temperature probe, and controlling the charging box to pair with the target wireless temperature probe;

the determining whether a scanned device exists a wireless temperature probe to be paired according to the acquired broadcast signal comprises:

determining a key data feature of the acquired broadcast signal, wherein the key data feature comprises at least one of: a data format, a length, or a type; and comparing the key data feature with a preset data feature, and confirming that the scanned device exists the wireless temperature probe to be paired when the key data feature is the same as the preset data feature, wherein the preset data feature is a data feature extracted according to the wireless temperature probe.

2. The method according to claim 1, wherein the determining whether the wireless temperature probe to be paired is in the pairable state according to the acquired broadcast signal comprises:

determining whether a signal strength of the acquired broadcast signal is in a preset strength range; and determining that the candidate wireless temperature probe is in the pairable state when the signal strength of the acquired broadcast signal falls within the preset strength range.

3. The method according to claim 2, wherein the determining whether the wireless temperature probe to be paired is in the pairable state according to the acquired broadcast signal further comprises:

determining that the wireless temperature probe to be paired is in a forbidden state when the signal strength of the acquired broadcast signal does not fall within the preset strength range.

4. The method according to claim 1, wherein the mobile terminal establishes a communication connection with the charging box of the wireless probe thermometer, and the mobile terminal sending the pairing mode start command to the charging box comprises:

the mobile terminal establishing a Bluetooth or WiFi communication connection with the charging box, and the mobile terminal sending the pairing mode start command to the charging box through the Bluetooth or WiFi communication connection.

5. The method according to claim 1, wherein the mobile terminal establishes a communication connection with the charging box of the wireless probe thermometer, the mobile terminal sending the pairing mode start command to the charging box comprises:

the mobile terminal establishing a WiFi communication connection with the charging box through a router, and the mobile terminal sending the pairing mode start command to the charging box by using the WiFi communication connection; or, the mobile terminal establishing a hybrid communication connection with the charging box through a mobile base station, a cloud server and a router, and the mobile terminal sending the pairing mode start command to the charging box by using the hybrid communication connection.

6. The method according to claim 1, wherein the mobile terminal or the charging box determining the target wireless temperature probe from the candidate wireless temperature probe comprises:

the mobile terminal or the charging box displaying the candidate wireless temperature probe, and determining the target wireless temperature probe from the candidate wireless temperature probe according to a selection operation of a user; or, the mobile terminal or the charging box confirming a wireless temperature probe of the largest signal strength as the target wireless temperature probe from the candidate wireless temperature probe.

7. A pairing system of the wireless probe thermometer, comprising:

a mobile terminal, configured to establish a communication connection with a charging box of the wireless probe thermometer to send a pairing mode start command to the charging box;

the charging box, configured to receive the pairing mode start command, enter a pairing mode according to the pairing mode start command, and delete original pairing information;

a wireless temperature probe to be paired, configured to send a broadcast signal when the wireless temperature probe to be paired is placed at the charging box, wherein the broadcast signal comprises request pairing information, and the request pairing information is used to indicate that the wireless temperature probe to be paired is in a pairable state;

the charging box or the mobile terminal, further configured to acquire the broadcast information of the wireless temperature probe, determine whether a scanned device exists the wireless temperature probe to be paired according to the acquired broadcast signal, when the wireless temperature probe to be paired exists, determine whether the wireless temperature probe to be paired is in the pairable state according to the acquired signal, and confirm the wireless temperature probe to be paired in the pairable state as a candidate wireless temperature probe; and the mobile terminal or the charging box, further configured to confirm a target wireless temperature probe from the candidate wireless temperature probe, and control the charging box to pair with the target wireless temperature probe;

wherein the charging box or the mobile terminal is further configured to confirm a key data feature of the acquired broadcast signal, wherein the key data feature comprises at least one of: a data format, a length, or a type; and compare the key data feature with a preset data feature, and confirm that the scanned device exists the wireless temperature probe to be paired when the key data feature is the same as the preset data feature, wherein the preset data feature is a data feature extracted according to the wireless temperature probe.

8. A computer readable storage medium, wherein the computer readable storage medium stores computer programs, the computer programs execute the pairing method of the wireless probe thermometer according to claim 1 when running on processors.

* * * * *